Inventor:
Warren W. Sackett

Patented May 22, 1934

1,959,877

UNITED STATES PATENT OFFICE 1,959,877

HEAT REGULATOR FOR OVENS AND THE LIKE

Warren W. Sackett, Milwaukee, Wis., assignor to Milwaukee Gas Specialty Company, Milwaukee, Wis., a corporation of Wisconsin Application November 16, 1931, Serial No. 575,266

21 Claims. (Cl. 236—15)

My invention relates to heat regulators for ovens and the like, and more particularly to oven heat regulators of the type disclosed and claimed in the copending application of Oscar J. Leins and Howard C. Rawlings, now Patent No. 1,878,937, although it is to be understood that the present invention is not limited to heat regulators of this type but may be embodied in other types of devices within the scope of the appended claims.

Heat regulators of the general type selected for illustration herein comprise means for controlling the heating medium, that is, the gas, oil or electric current; a thermally operated device which actuates the controlling device, and a selecting device for the purpose of selecting particular temperatures to be maintained within the oven or the like.

It is desirable, for obvious reasons, to mount the thermally responsive device in the oven in such a way and at such a place that its action will be indicative of the prevailing temperature therein, and, for various reasons, it is desirable to mount the controlling mechanism in a remote position to facilitate connection in the heating system and to reduce the piping or wiring. It is also desirable to remove the controlling mechanism from the relatively high heating temperatures.

Due to lack of space and for other reasons, the gas supply pipes or other heat supply means must be installed where they are not as accessible as desired from the inside of the oven or through the wall of the oven and where the connecting means between the thermal sensitive device and the heat control device cannot properly be positioned within the wall of the oven. For example, in some cases it is necessary to place the gas or other fuel supply pipe below the pipe for feeding the gas to the oven burner, and in other cases it is necessary to dispose this pipe remote from the side of the oven and even below the oven.

The present invention provides for properly mounting the thermal sensitive device within the oven wall and in position where it will be indicative of the prevailing temperature in the oven and at the same time for positioning the control device in proximity to the heating means or its supply where that heating means or the supply therefor is not accessible from within the oven or through the side wall of the oven.

The present invention further provides for positioning the connecting means between the control device and the thermal sensitive device outside the oven wall, and the complete heat regulator with the selecting device, thermal sensitive device, control device and connections therebetween may be installed as a unit assembly with the parts in predetermined relation and without passing the control device through the oven wall or into or through the space within that wall.

The thermal sensitive device is of a character suitable for positioning between the inner and outer wall members of a double-walled oven and for installation in unitary assembled relation with a selecting device positioned outside the oven structure and a control device and connecting means between the control device and thermal sensitive device also positioned outside the oven structure.

In the illustrated embodiment of the invention the thermal sensitive device is positioned within the oven structure in position where it will be indicative of the prevailing temperatures therein, and the operating connection between the control device and the thermal sensitive device passes out through the wall of the oven independently of the connection between the selecting device and the thermal sensitive device.

The manner in which the foregoing advantages are obtained, as well as the details of construction and arrangement of the parts of the device of the present invention, will be more readily apparent from the following detailed description taken in connection with the accompanying drawings showing an illustrative embodiment of the invention and in which.

Figure 1:
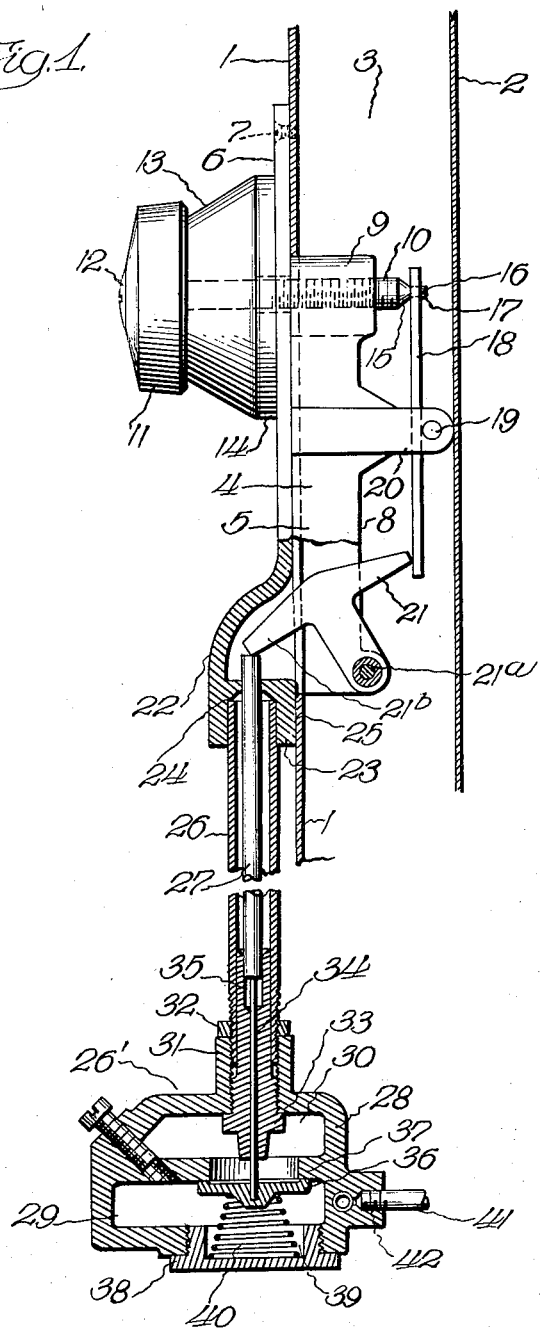
Figure 1 is a fragmentary vertical section through the side wall structure of an oven showing a heat regulator embodying the present invention in place therein, the regulator mechanism being partially in section and partially in elevation.

Referring to the drawings, the exterior wall of the oven is indicated at 1, and spaced inwardly from this wall is an inner wall or oven liner 2, the purpose of which is well understood in the art. The device of the present invention is applicable whether there is an inner liner or not, and this liner is shown to illustrate the adaptability of the present device to a wall structure of this character. As is well known in the art, the wall 1 with the liner 2 define a space indicated at 3 which serves as an air chamber to prevent rapid transmission of heat from the interior of the oven.

The outer wall 1 has an opening 4 which is of a size to permit passage of the thermal sensitive element assembly therethrough and into position within the space 3 where it will be subject to the prevailing temperature within the oven. This thermal sensitive assembly is indicated generally by the reference numeral 5 and comprises a flange plate 6 which overlaps the cut-out portion or opening 4 in the oven wall and which forms a support for mounting the assembly 5 in rigid position with respect to the oven wall. The flange 6 is secured to the oven wall by means of bolts or screws 7 and is provided with a projecting portion 8 which is adapted to be inserted into the opening 4 in the oven.

The portion 8 provides a suitable housing for mounting the thermal sensitive element and its associated controls. The housing 9 is provided at the upper portion of the assembly 5 and is threaded internally to receive a control or selecting spindle 10, which is threaded into the housing 9 and passes through a suitable opening in the flange 6 to provide a suitable extending portion for receiving the knurled operating knob 11, this operating knob being secured on the spindle 10 in any suitable manner, as by means of abutment with washers disposed in frictional engagement with a shoulder formed on the spindle, and is held in position by means of an adjusting screw 12 threaded into the projecting end of the stem 10.

The adjusting screw 12 is threaded into the stem 10 for the purpose of initially adjusting the position of the knob 11 and its associated selecting dial 13, this dial being of substantially hollow conical section and being provided with suitable markings on its outer surface for indicating the respective temperatures at which the oven is to be operated. A coaxial flange 14 is provided on the plate 6 for cooperating with the inner edge of the dial 13 to limit the inward movement thereof and may be provided with means for indicating the relative position of the control dial 13 with respect to a point on the flange.

The entire assembly, comprising the stem 10, the dial 13, the operating knob 11 and the cooperating flange 14 may be termed a selecting mechanism. The operating knob 11 is rotated to bring the marking on the dial 13 into alignment with the indicating means provided on the flange 14 for selectively determining the temperature which is desired in the oven.

The end of the stem 10 which projects between the oven wall has a tapered portion 15 which terminates in a projecting stud portion 16 which is adapted to pass through a cooperating opening 17 in the thermal sensitive element 18. The thermal sensitive element comprises two strips of thermally responsive metal which possess different coefficients of expansion, the strip possessing the higher coefficient of expansion being positioned inwardly for engagement with the tapered portion 15 of the stem 10. The stud portion 16 of the stem 10 has a loose fit within the opening 17 and the element 18 is actuated by the abutting engagement against the tapered portion 15 of the stem.

The thermal sensitive element 18 extends downwardly from the spindle 10 and is fulcrumed about a pivot pin 19, the pin 19 being supported between a pair of arms 20 extending from the flange plate 6. The supporting arms 20 may be formed integral with the flange plate or may be secured thereto, and are preferably rigidly spaced apart by means of the pin 19 so that the element 18 may have free rocking movement thereabout.

The lower end of the assembly 5 has an extending portion provided with a pivot pin 21a about which a T-shaped bellcrank 21 is adapted to rotate. One arm of the T-shaped bellcrank 21 has free abutting contact with the lower surface of the element 18, and is actuated thereby. The flange plate 6 has an outwardly flared portion 22 adapted to provide a suitable housing or covering for the rocker arm 21, the lower portion of this flared covering being formed to provide a vertical housing 23 having an internal recess 24.

The housing 23 is adapted to have abutting engagement against the wall 1, as indicated at 25, this engagement providing a rigid support for the flange plate 6 at its lower portion. It is thus apparent that the plate 6 is rigidly secured to the oven wall 1 and that the cut-out portion 4 of the oven wall is entirely closed by this plate.

Threaded or otherwise suitably secured in the recess 24 formed in the housing 23 is a tubing or conduit member 26, which surrounds a control rod 27. The control rod 27 extends upwardly through the housing 23 and has free abutting contact with the other arm 21b of the rocker arm 21. The control rod 27 may comprise a solid metallic rod of sufficient diameter to transmit the compressive force exerted by the rocker arm 21b to a suitable control means for the fuel supply.

This control means preferably comprises a valve, indicated generally at 26′, and which is adapted to be positioned at any convenient location, preferably in proximity to the gas supply pipe. The controlling device 26′ comprises a valve body 28 cored to provide a pair of internal valve chambers 29 and 30 separated by an integral partition 37 having a valve opening 36′ therethrough. The lower chamber 29 has a downwardly extending opening internally threaded and closed by a cap or plug 38 which is adapted to be threaded into the opening and which has a hexagonal flange or head at its lower end seating tightly against the bottom of the valve body portion 28.

The valve opening 36′ is controlled by a valve disc 36 having an axially depending portion which fits in the upper reduced end of the generally conical spring member 40 interposed between the valve disc 36 and the cap 38, and yieldingly urges the valve disc 36 toward its seat, this seat being formed by the portion of the partition 37 marginally surrounding the opening 36′. The cap 38 is preferably recessed at 39 to receive the adjacent enlarged end of the spring 40.

The tube 26 forms an extension which is threaded into the housing 23 at its upper end and at its lower end into an integral hub portion 31 formed on the top of the valve body 28 and connects the valve body and the thermal sensitive assembly into a unitary assembly. The rod 27 extends down through the tube 26 and at its lower end abuts a valve stem or pin 34, the lower end of which, in turn, engages the valve disc 36 in a recess therein as shown. This arrangement permits the rod 27 to unseat the valve disc an amount corresponding to the setting of the selecting device, as will be apparent from the drawings. A bushing or bearing member 33 is threaded in the integral hub portion 31 of the valve body and is flanged to seat against the bottom side of the top wall of the valve body.

The upper end of the bushing 33 is recessed at 35 to receive and guide the lower end of the control rod 27. A nut 32 is threaded on the top of the hub portion 31 for the purpose of securely locking the tube 27 in position.

A pilot or lighter tube 41 is threaded as at 42 (Figure 4) into the valve body 28 and opens into the chamber 29 through a duct or by-pass 43. The free end of the tube 41 is provided with a pilot tip 44 disposed to maintain a pilot or lighter flame adjacent the oven burner, indicated at 50. A threaded metering screw 45 threaded into the valve body and cooperable with the duct 43 leading from the chamber 29 into the pilot tube 41, is adapted for adjusting or regulating the flow of fuel to the pilot tip.

Figure 4:
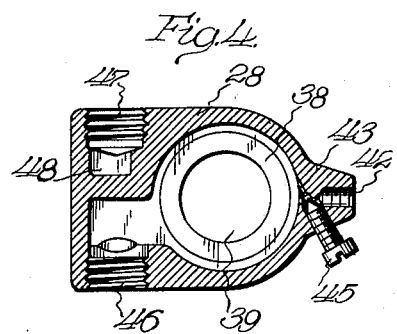
Figure 4 is a horizontal section taken on the line 4—4 of Figure 2.

Referring to Figure 4, valve body 28 is tapped and threaded internally at 46 to receive a supply pipe leading from the main gas manifold to the control device. The opening 46 leads into the inlet chamber 29 of the valve. A second opening 47 is provided in the valve body 28 and communicates with a passage 48 leading to the outlet chamber 30 of the control device. For the purpose of always maintaining at least some supply of gas from the chamber 29 to the chamber 30 and, therefore, to the burner 50 when the valve on the main supply pipe is opened, so that the burner 50 cannot be extinguished by the regulator when the valve on the main supply pipe has been opened, a by-pass passage 51 connects the chambers 29 and 30.

A metering screw 52 threaded into the valve body and cooperable with the passage 51 is adapted for metering or regulating this passage and the fuel supply to the chamber 30 therethrough.

The oven burner 50 has the mixing head 53 connected thereto by means of a suitable conduit 54. The head 53 is provided with the usual air admission openings and is connected with a suitable tube or conduit leading from the opening 47 in the outlet chamber of the valve or control device 26' and which terminates in a suitable nipple delivering the fuel into the mixing head 53.

Figure 2:
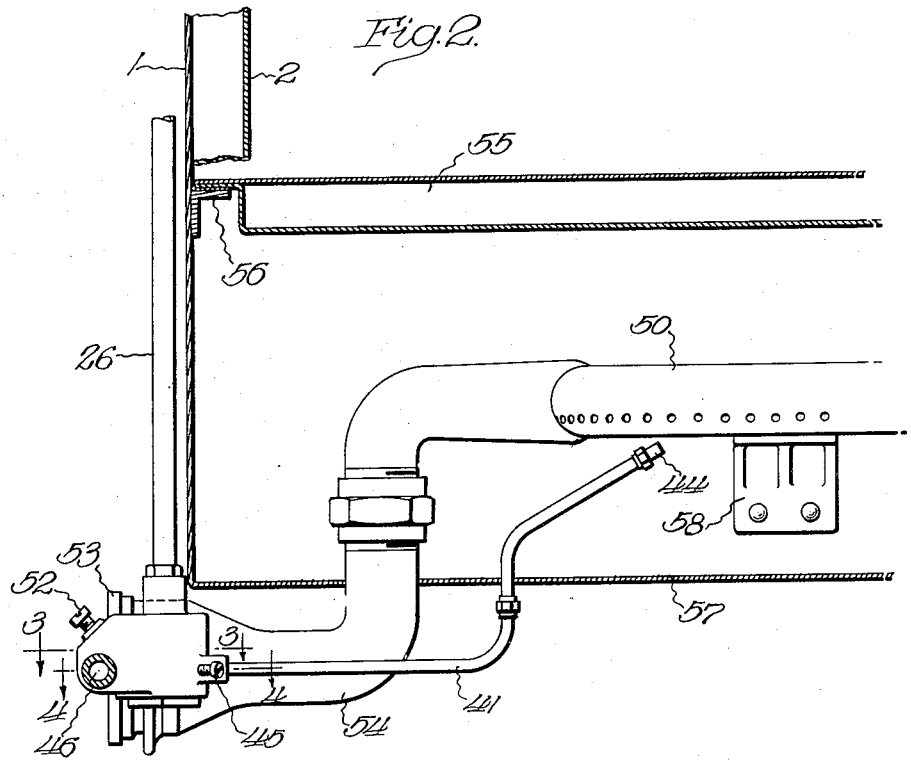
Figure 2 is a diagrammatic elevational view showing the lower part of the regulator and the associated portion of the oven.
Figure 3:
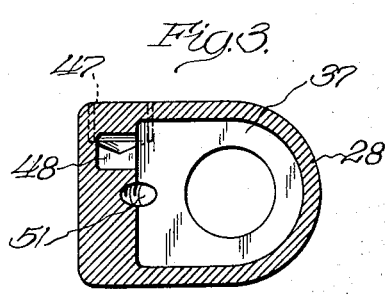
Figure 3 is a horizontal section taken on the line 3—3 of Figure 2.

As best shown in Figure 2, the oven burner 50 is disposed below the oven tray 55, this tray being suitably supported on brackets 56 secured to the sides of the oven walls. The conduit 54 leading to the burner 50 passes through the bottom wall of the oven 57, this construction being illustrative only, and showing the installation as applied to an oven where the main gas supply pipe is disposed in a plane below the bottom oven wall. The burner 50 is suitably supported by means of a bracket or brackets 58 secured in the space between the oven tray 55 and the bottom wall of the oven 57.

The installed regulator may be calibrated at the factory and assembled as described as a unitary structure without changing the relationship of its parts. If desired, the regulator may be calibrated with a standard thermometer by placing such a thermometer within the oven with the regulator in position, and, in the event of any discrepancy between the thermometer reading and the dial reading of the regulator, the screw 12 may be released sufficiently to release the knob 11 and dial 13, so that the dial 13 may be turned free of the spindle or stem 10 in either direction to register the scale markings thereon with the thermometer reading and with the cooperating indicating means on the flange 14. The screw is then again tightly threaded into the spindle 10 and the knob 11 and dial 13 are clamped together in the proper recording position.

Turning of the knob 11 in a clockwise direction threads the stem 10 inwardly and the inner end of the stem by its cooperation with the upper end of the thermal sensitive element 18 tilts or pivots this member about the pin 19 as a fulcrum in a clockwise direction. This tilting swings the lower end of the thermal sensitive element against the arm of the rocker arm 21, rotating the rocker arm in a counter-clockwise direction upon its pivot 21a and thereby, through the rod 27 and stem 34, moves the valve 36 away from its seat.

Turning of the knob 11 in the opposite direction threads the stem 10 outwardly, whereupon the spring 40 moves the valve 36 toward its seat and swings the thermal sensitive member 18 in the opposite direction about the pivot pin 19 to hold the upper end of the thermal sensitive element in cooperation with the stem 10. In this manner turning of the knob provides a valve opening corresponding with the setting of the dial and thereby provides for obtaining a temperature within the oven corresponding to the dial position, and any variation of that temperature will warp or influence the thermal sensitive member in one direction or the other, depending upon whether the variation is an increase in temperature or a decrease in temperature.

An increase of temperature will result in the element 18 being warped outwardly away from the rocker arm 21, while a decrease in temperature will tend to warp the arm in the opposite direction, or tend to force the arm into abutting engagement with the rocker arm 21 and serve to open the valve 36 to a position slightly greater than that obtained by the dial 30. Thus the action of the thermal sensitive element 18 under any increase or decrease in the temperature at which the regulator is set, will be transmitted through the motion transmitting connection to increase the valve opening or to permit decreasing of the valve opening by the spring 40 so that the temperature for which the regulator is set will be accurately maintained.

It is readily apparent that because of the relatively free engagement of the protecting stud portion 16 of the stem 10 with the upper end of the thermal sensitive element 18, the free pivotal action of the element 18 about the pivot 19, and the abutting contact of the arm 21 with the lower end of the element 18, that the element 18 occupies a position such that it may pivot about the pin 19 without binding or interfering in any way with its thermal properties.

The thermally responsive device is disposed so that its action will be indicative and proportionate to the prevailing temperature in the oven, and the controlling mechanism is disposed in a remote position to facilitate the connection in the supply system. It is apparent that the thermal sensitive element assembly and the selecting mechanism can be assembled as a unitary structure in the cut-out portion of the oven wall. The device is installed by the simple expedient of inserting the projecting portion of the assembly 5 through the cut-out portion of the wall and securing it in position by means of the screws 7. The controlling device is then installed in position with relation to the supply pipe and the tube 26 is then inserted between the housing 23 and the controlling device 26'.

Thus I have provided a heat regulator, the controlling means of which may be installed in any suitable position, depending upon the position of the supply means for supplying fuel to the oven burner, which may be easily connected to the selecting mechanism and the thermal sensitive element, and which may be easily and quickly installed.

Having thus described my invention, I claim:

1. In an oven, an outer wall, an inner wall spaced therefrom, a thermal sensitive device mounted within the space between said walls, a selecting device, a control device, and a pivotally mounted bell crank connecting said control device and said thermal sensitive device and having a portion thereof extending through the outer wall.

2. The combination with an oven having an inner wall and outer wall provided with an opening, of a heat regulator comprising an extension having a control device, a thermally operated device and a selecting device all mounted upon said extension in pre-correlated relation and constituting a unitary assembly adapted for application to the oven in unitary assembled relation by movement of the thermally operated device through the opening in the outer wall and into position in the space between said walls with the selecting device and controlling device at all times outside the outer wall, and bell crank means pivotally mounted within said walls upon said extension and operable through the outer wall for connecting the thermally operated device with said control device.

3. In an oven, an exterior wall, an interior wall spaced inwardly therefrom, said exterior wall having a cut-out portion, a thermal sensitive mechanism adapted to be inserted through said exterior wall into the space between said walls, a support for said mechanism, a flange carried by said support and adapted to be secured to said exterior wall, said flange having a lower outwardly flared portion, and means disposed within said space and adapted to transmit action of said thermal sensitive mechanism to a point exterior of said exterior wall and enclosed by said outwardly flared portion.

4. In an oven, an exterior wall, an interior wall spaced inwardly therefrom, said exterior wall having a cut-out portion, a thermal sensitive mechanism adapted to be inserted through said exterior wall into the space between said walls, said thermal sensitive mechanism including a support having a flange adapted to be secured to said exterior wall, a socket on the thermal sensitive mechanism support and disposed outside the exterior wall, a tube secured in said socket, a control device on the opposite end of the tube, an actuator extending within the tube and cooperable at one end with the control device, and means operable through the exterior wall for transmitting the action of the thermal sensitive mechanism to the opposite end of said actuator.

5. In an oven, an exterior wall, an interior wall spaced inwardly therefrom, said exterior wall having a cut-out portion, a thermal sensitive device adapted to be inserted through said exterior wall into the space between said walls, a support for said device, a flange carried by said support and adapted to be secured to said exterior wall, means for transmitting movement of said thermal sensitive device through said exterior wall, fuel supply controlling means comprising a control rod associated with a valve and responsive to said transmitting means, said flange being flared outwardly and carrying a housing adapted to receive the upper end of said control rod.

6. In an oven, an exterior wall, an interior wall spaced inwardly therefrom, said exterior wall having a cut-out portion, a thermal sensitive device adapted to be inserted through said exterior wall into the space between said walls, a support for said device, a flange carried by said support and adapted to be secured to said exterior wall, means for transmitting movement of said thermal sensitive device through said exterior wall, fuel supply controlling means comprising a control rod associated with a valve and responsive to said transmitting means, said flange being flared outwardly and carrying a housing adapted to receive the upper end of said control rod, said flange entirely covering said cut-out portion of said exterior wall.

7. In an oven, an exterior wall, an interior wall spaced inwardly therefrom, said exterior wall having a cut-out portion, a thermally sensitive device having a support adapted to be inserted through said exterior wall into the space between said walls, a flange carried by the support for said thermally sensitive device and adapted to be secured to said exterior wall, transmitting means comprising a bell crank lever pivotally mounted on said support and adapted to transmit movement of said thermal sensitive device to a point exterior of said exterior wall, and a selecting device disposed outside the exterior wall and connected to said thermally sensitive device.

8. In a device of the class described, a wall member, a rotary indicator, a flanged housing for supporting said indicator, a control screw threaded in said housing and actuated by said indicator, a rocker arm carried by said housing and operable through an opening in the wall member, means responsive to said control screw for actuating said rocker arm, a fuel supply means, and control means for actuating said fuel supply means, said control means being actuated by said rocker arm.

9. In combination, a wall member, a thermally operated device disposed on the inside of the wall member, a selecting device disposed outside said wall member and having direct abutting engagement with one end of said thermally operated device, a control device remote from the thermally operated device and means operable through an opening in the wall member connecting the opposite end of said thermally operated device with said control device to operate said control device upon operation of said selecting device.

10. In combination, an oven having a wall member, a burner for the oven, fuel supply means for the burner, a thermally operated device disposed on the inner side of the oven wall, a selecting device outside said wall including a rotatable spindle having abutting engagement with one end of said thermally operated device, a control device disposed below the selecting device and in proximity to the fuel supply means, and means operable through an opening in the oven wall for connecting said thermally operated device with said control device, said means having abutting engagement with said thermally operated device at all times.

11. In combination, a wall having an opening therethrough, a thermally operated device including a thermostatic element capable of passing through said opening and including a support for disposition partially within and partially outside the wall, a spindle having threaded engagement with the support, selecting means on said spindle for manipulating the same to adjust the thermally operated device, means on the support for closing the opening in the wall, means on said support and operable through said wall for transmitting the action of said thermally operated device through said wall, a tube connected to the portion of the support outside the wall and depending from said support, a valve member at the lower end of said tube and outside said wall, and rod means extending through said tube and connecting said transmitting means with said valve member.

12. In combination, an oven wall having an opening therein, a flanged housing secured in said opening and having an outwardly flared lower portion, a thermally sensitive member pivotally supported on one side of said housing, a selecting device on the opposite side of said housing and engaging one end of said thermally sensitive member, and a pivotally mounted motion transmitting means at the other end of said thermally sensitive member.

13. In combination, an oven wall having an opening therein, a flanged housing secured in said opening and having an outwardly flared lower portion, a thermally sensitive member pivotally supported on one side of said housing, a selecting device on the opposite side of said housing and engaging one end of said thermally sensitive member, and pivotally mounted motion transmitting means at the other end of said thermally sensitive member and extending through said opening adjacent the flared portion of said housing.

14. In combination, an oven wall having an opening therein, a flanged housing secured in said opening and having an outwardly flared lower portion, a thermally sensitive member pivotally supported on one side of said housing, a selecting device on the opposite side of said housing and engaging one end of said thermally sensitive member, pivotally mounted motion transmitting means at the other end of said thermally sensitive member, said means extending through said opening adjacent the flared portion of said housing, and a control device disposed beneath said selecting device and having an operating rod engaged by said motion transmitting means, said control device being secured to the outwardly flared portion of said housing.

15. In an oven, an exterior wall having an opening formed therein, a heat regulator mechanism including a housing adapted to extend through said opening into said oven, a flange on said housing engaging said wall for securing said housing in position and for closing said opening, an outwardly flared section having a boss portion formed at the lower end of said flange, a thermally sensitive member pivotally supported on said housing, a control device secured to said boss portion, and means pivotally mounted on said housing for transmitting movement of said thermally sensitive member through said flared section to said control device.

16. In an oven, an oven wall, a selecting device mounted on the exterior side of said wall, a thermally sensitive device mounted on the interior of said wall and having abutting engagement with said selecting device, a control device on the exterior of said wall and having a control stem extending parallel to said thermally sensitive member, and means pivoted between said thermally sensitive device and said stem for transmitting movement of said thermally sensitive member through said wall to said control stem.

17. In a heat regulator adapted to be mounted on an oven wall, a selecting device having an extending spindle, a control device having a control stem extending normal to said spindle on one side of said wall, a pivotally mounted thermally sensitive member extending parallel to said stem on the opposite side of said wall, and having abutting engagement with said spindle, and abutting means for transmitting movement of said thermally sensitive member through said wall to said control stem.

18. In combination, an oven wall having an opening therein, a flanged housing secured in and closing said opening, a thermally sensitive member pivotally supported on one side of said housing, a selecting device on the opposite side of said housing having abutting engagement with one end of said member, and motion transmitting means extending through said opening and having abutting engagement with the other end of said member.

19. In combination, an oven wall having an opening therein, a housing secured in said opening and having a flanged portion engaging said wall, a thermally sensitive member pivotally mounted on said housing, and pivotally mounted motion transmitting means having abutting engagement with one end of said member and extending through said opening.

20. In combination, an oven wall, a thermally sensitive member pivoted on one side of said wall, a selecting spindle abutting one end of said member, motion transmitting means abutting the other end of said member and extending outwardly through said wall, a control stem on the opposite side of said wall having abutting engagement with said motion transmitting means, and spring means for maintaining tight abutting engagement from said spindle to said control stem.

21. In a heat regulator for an oven having an oven wall, a selecting device mounted on said wall, a thermally sensitive device disposed parallel to said wall on one side thereof and engaged by said selecting device, a control device disposed on the opposite side of said wall and having a control stem extending parallel to said thermally sensitive device, and means for transmitting movement of said thermally sensitive device through said wall to said control stem.

WARREN W. SACKETT.